United States Patent [19]
Chown

[11] 4,147,402
[45] Apr. 3, 1979

[54] PROCESS FOR MANUFACTURING AN OPTICAL FIBER TERMINATION

[75] Inventor: Martin Chown, Harlow, England

[73] Assignee: International Standard Electric Corporation, New York, N.Y.

[21] Appl. No.: 811,575

[22] Filed: Jun. 30, 1977

[51] Int. Cl.² ............................................. G02B 5/14
[52] U.S. Cl. ........................ 350/96.18; 219/121 LM; 350/96.15; 350/320
[58] Field of Search ......... 219/121 LM; 350/96 WG, 350/96 C, 320, 96.15, 96.18, 96.20

[56] References Cited
U.S. PATENT DOCUMENTS

| | | | |
|---|---|---|---|
| 3,410,979 | 11/1968 | Larsson | 219/121 LM X |
| 3,718,383 | 2/1973 | Moore | 350/320 UX |
| 3,864,019 | 2/1975 | Smolinsky et al. | 350/96 C X |

FOREIGN PATENT DOCUMENTS

1429843  3/1976  United Kingdom ................... 350/96 C

OTHER PUBLICATIONS

"The Laser as a Machine Tool", Engineering, vol. 206, No. 5333, Jul. 5, 1968, p. 22.

*Primary Examiner*—John K. Corbin
*Assistant Examiner*—John D. Lee
*Attorney, Agent, or Firm*—Thomas L. Peterson

[57] ABSTRACT

A process is disclosed for manufacturing a lens termination for an optical fiber using laser machining to form a cavity which centers the fiber in the termination.

4 Claims, 5 Drawing Figures

PROCESS FOR MANUFACTURING AN OPTICAL FIBER TERMINATION

BACKGROUND OF THE INVENTION

This invention relates to methods of making lens terminations for optical fibers.

Ball-lens terminations may be used for terminating optical fibers and for optically coupling such fibers together. Such an optical fiber termination for a clad fiber may include a whole or truncated substantially spherical lens, and means for mounting the lens adjacent the bared fiber end such that light emitted from the fiber end is refracted into a substantially parallel beam by the lens.

SUMMARY OF THE INVENTION

According to the present invention, there is provided a process for manufacturing a lens termination for an optical fiber. A plastic preform is provided comprising a tube member with a coaxial bore having one end closed by a lens at least the rearward portion of which comprises a plastic material. The bore and lens are arranged such that the base of the bore lies in the focal plane of the lens. Light is directed from a laser through the lens so as to focus the light onto the base of the bore thus evaporating a portion of the plastic material to form a cavity which, when the termination is in use, receives the bared end of a coated optical fiber.

DESCRIPTION OF THE PREFERRED EMBODIMENTS

Figure 1:
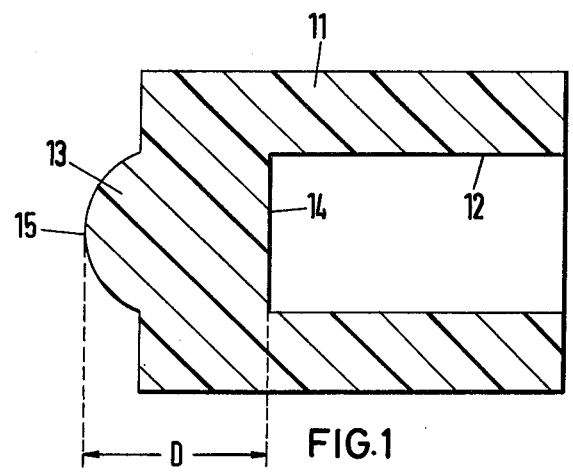
FIG. 1 is a longitudinal sectional view of a machined plastic blank used in the process of the invention.
Figure 2:
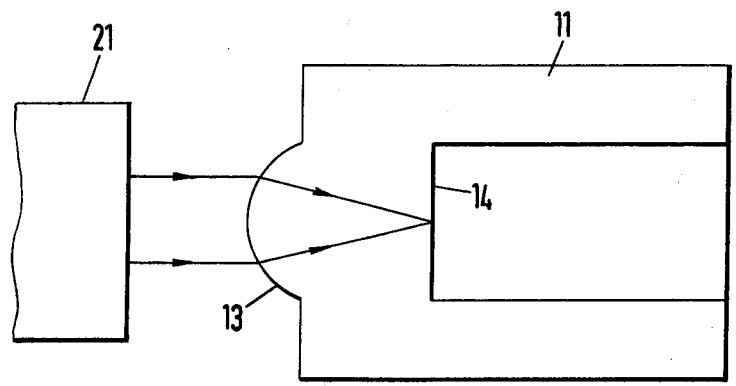
FIG. 2 is a schematic illustration showing the method of laser machining the fiber locating cavity in the blank of FIG. 1.
Figure 3:
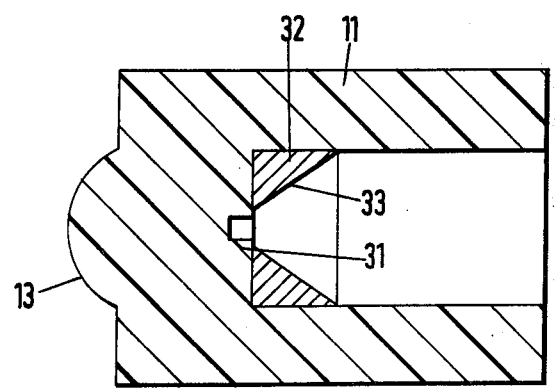
FIG. 3 is a longitudinal sectional view of a finished fiber termination.

Referring to FIGS. 1 to 3 in detail, a rod-shaped body of plastic, e.g. acrylic, material is machined to form the blank shown in FIG. 1. The blank comprises a plastic body 11 having a coaxial bore 12 and an integral ball lens 13 closing the forward end of the bore. The bottom surface 14 of the bore 12 is arranged such that the focal point of the ball lens 13 lies in the plastic material just below the surface 14. Preferably, the tolerance in the distance D (FIG. 1) between the surface 14 and the pole 15 of the lens 13 should not exceed 10 microns.

FIG. 2 shows the method of laser machining the preform to prepare the finished termination. A parallel beam laser and lens assembly 21 is arranged so as to direct light parallel to the axis of the preform. The light is focused by the lens 13 to a point just below the surface 14 so that a small quantity of the plastic material at the base of bore 12 is evaporated to form a cavity 31 (FIG. 3). Since the laser beam is parallel to the axis of the preform, the cavity 31 is machined in the correct centered position for receiving a fiber end (not shown) in the finished termination.

The output wavelength or wavelengths of the laser should be chosen such that the light is fairly well absorbed by the plastic material. Aternatively, the surface 14 may be treated with a light absorbing material.

The termination is completed as shown in FIG. 3 by the insertion in the bore 12 of a guide ring 32 which has a conical guide surface 33 for directing the fiber end into the cavity 31. In some applications this ring may be dispensed with and the conical surface 33 may then be formed integral with the plastic body 11.

Figure 4:
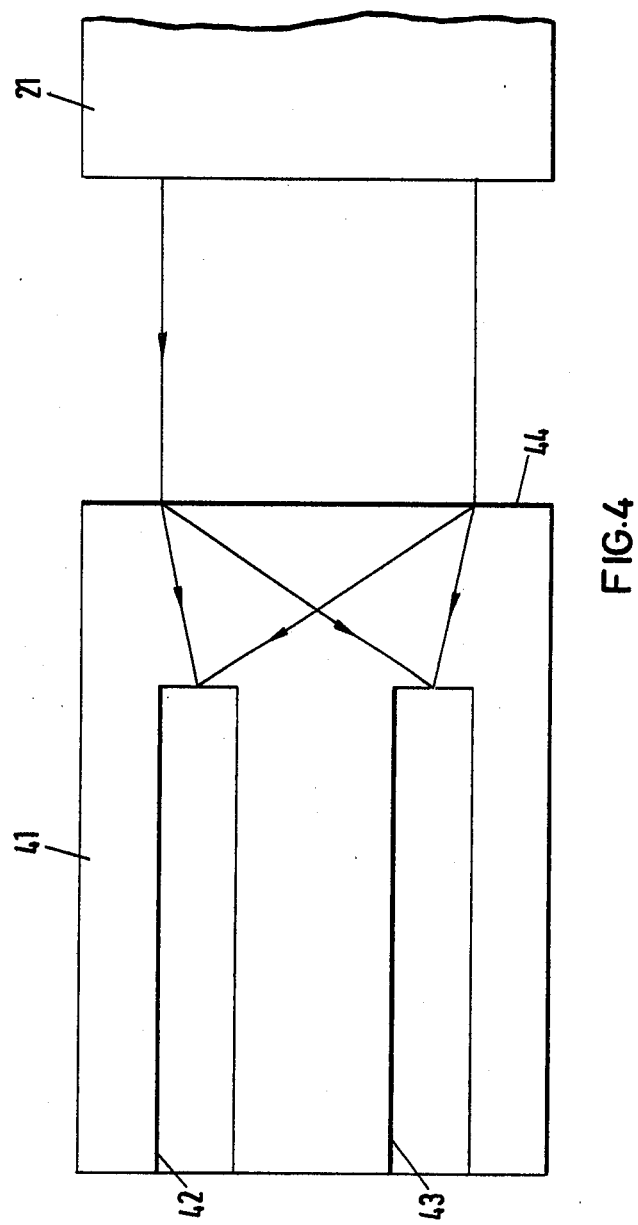
FIG. 4 is a schematical illustration showing a Fresnel-type combined termination and a laser.

This laser machining technique may also be employed with terminations in which the ball lens is replaced by a Fresnel lens. Such an arrangement is shown in FIG. 4.

A plastic body member 41 is provided with first and second bores 42 and 43 each for receiving an optical fiber (not shown). The face 44 of the body member is formed into a double Fresnel lens arrangement having first and second portions which focus on the ends of the first and second bores, respectively. As before, illumination of the Fresnel lens system by an axially aligned laser 21 evaporates a cavity in each bore for receiving the bared end of an optical fiber.

Figure 5:
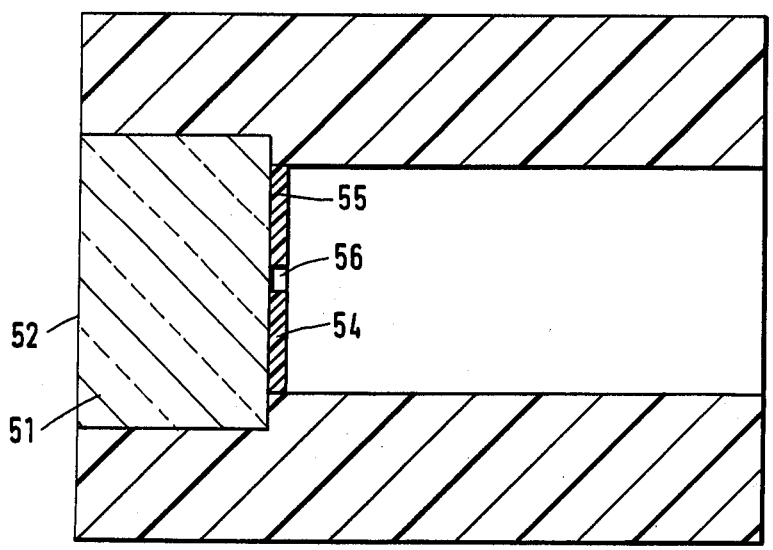
FIG. 5 is a longitudinal sectional view of a termination fitted with a graded refractive index lens.

In some applications, the fiber termination (as shown in FIG. 5) may employ a graded refractive index self-focusing lens 51, the front surface 52 of which is provided with an anti-reflection coating. The physical length of the lens 52 is determined such that the lens focus lies outside the lens, but within a plastic coating 54 applied to the lens rear surface 55. A laser beam directed coaxial with the optical axis of the lens evaporates a cavity 56 in the plastic coating 54 for receiving an optical fiber (not shown). The plastic coating is required with graded refractive index lenses as such lenses are normally made by fusing together several different glasses. If, however, the lens is made of a plastic material, the rear coating 54 may then be dispensed with.

The terminations described herein are suitable for use with plastic coated clad silica optical fibers, but may also be used with plastic coated glass, plastic, or unclad silica fibers.

What is claimed is:

1. A process for manufacturing a lens termination for an optical fiber comprising the steps of:
   providing a plastic preform comprising a tube member with a coaxial bore and having one end closed by a lens, said bore and lens being arranged such that the focal plane of said lens lies just below the surface of the base of said bore; and
   directing light from a laser through said lens so as to focus the light onto said base of said bore thus evaporating a portion of the plastic material to form a cavity in said base opening to said surface and of a diameter less than that of said bore, said cavity thus formed being dimensioned to receive the bared end of an optical fiber.

2. A process as set forth in claim 1 wherein:
   said lens is a graded refractive index self-focusing lens, the rearward surface of which is coated with a layer of plastic material, said cavity being formed in said layer by said laser.

3. A process as set forth in claim 1 wherein:
   said lens is a plastic Fresnel lens.

4. An optical fiber lens termination made by the process of claim 1.

* * * * *